United States Patent [19]

Stephenson et al.

[11] 3,790,139
[45] Feb. 5, 1974

[54] INJECTOR APPARATUS

[75] Inventors: Robert A. Stephenson, Houston; Robert M. Zoch, Jr., Dickinson, both of Tex.

[73] Assignee: Enercon Corporation International, South Houston, Tex.

[22] Filed: July 22, 1970

[21] Appl. No.: 57,227

[52] U.S. Cl............. 261/18 A, 123/1 A, 123/25 L, 123/134
[51] Int. Cl. .......................................... Fo2m 25/02
[58] Field of Search...... 261/18 R, 8 A, 78 R, 69 A, 261/121–124, DIG. 2, 44, DIG. 19; 123/119 B, 134, 187.5, 119 R, 1 A, 119 A, 97 B; 137/483; 73/213

[56] References Cited
UNITED STATES PATENTS

| | | | |
|---|---|---|---|
| 1,201,300 | 10/1916 | Hikish......................... | 261/18 A UX |
| 1,556,114 | 10/1925 | Hopkins......................... | 261/124 |
| 1,780,019 | 10/1930 | Kemp......................... | 123/131 |
| 2,146,371 | 2/1939 | Dunglinson......................... | 73/213 |
| 2,505,292 | 4/1950 | Mallory......................... | 137/483 X |
| 2,699,157 | 1/1955 | Heftler et al. .................. | 123/97 B X |
| 2,709,579 | 5/1955 | Sykes........................... | 261/44 R X |
| 2,745,396 | 5/1956 | Harvey......................... | 261/18 R X |
| 3,559,963 | 2/1971 | Cedarholm .................. | 261/DIG. 19 |
| 2,831,756 | 4/1958 | Miles et al. ........................ | 48/184 |
| 2,922,407 | 1/1960 | Lee.............................. | 261/18 A X |
| 2,277,930 | 3/1942 | Mock et al..................... | 261/DIG. 2 |
| 1,013,214 | 1/1912 | Noyes........................... | 48/184 |
| 1,195,315 | 8/1916 | Williams...................... | 123/134 UX |
| 1,605,251 | 11/1926 | MacMillan et al............ | 261/18 R X |
| 1,632,654 | 6/1927 | Joerger et al. .................. | 261/121 R |
| 1,841,429 | 1/1932 | Bennett et al............... | 261/121 R X |
| 2,040,020 | 5/1936 | Parker......................... | 261/181 R X |
| 2,361,993 | 11/1944 | Chandler ...................... | 261/69 A X |
| 2,496,586 | 2/1950 | Kemp et al. ...................... | 48/184 X |
| 2,763,538 | 9/1956 | Pilling et al.................. | 261/69 A X |
| 3,059,628 | 10/1962 | Linn............................... | 123/119 B |
| 3,537,434 | 11/1970 | Herpin............................. | 123/134 |

FOREIGN PATENTS OR APPLICATIONS

| | | | |
|---|---|---|---|
| 684,074 | 3/1930 | France............................ | 261/18 R |

*Primary Examiner*—Tim R. Miles
*Assistant Examiner*—Richard L. Chiesa
*Attorney, Agent, or Firm*—Pravel, Wilson and Matthews

[57] ABSTRACT

The present apparatus has different combined elements depending on the pressure differential developed between a tube positioned in an air intake manifold system for a compression engine and the ambient atmosphere.

If the pressure differential is adequate to provide fluid flow through the fluid reservoir into the air manifold, a regulator member is positioned with the container to control the fluid flow.

If the pressure differential is not adequate to provide fluid flow through the fluid reservoir into the air manifold, a flow tube connected with the container is positioned in the air manifold to develop sufficient pressure differential.

If the air manifold pressure is greater than that of the ambient atmosphere, an impact tube connected with the container is placed upstream of the flow tube to develop adequate pressure differential by forcing air into the fluid container.

Additionally, a check valve may be positioned with the container to prevent fluid flow from the air manifold to the fluid container.

Finally, a needle valve may be positioned with the container to constantly regulate the fluid flow from the fluid reservoir to the engine air manifold.

4 Claims, 4 Drawing Figures

PATENTED FEB 5 1974
3,790,139
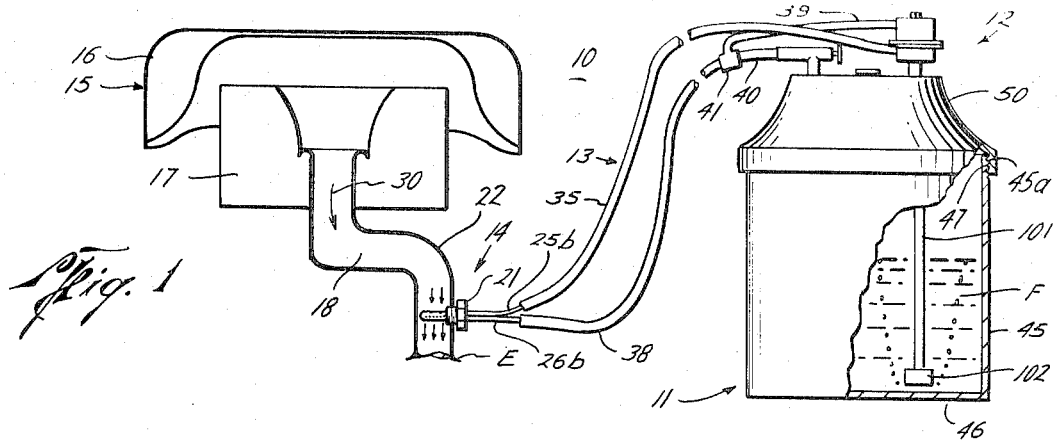
Fig. 1
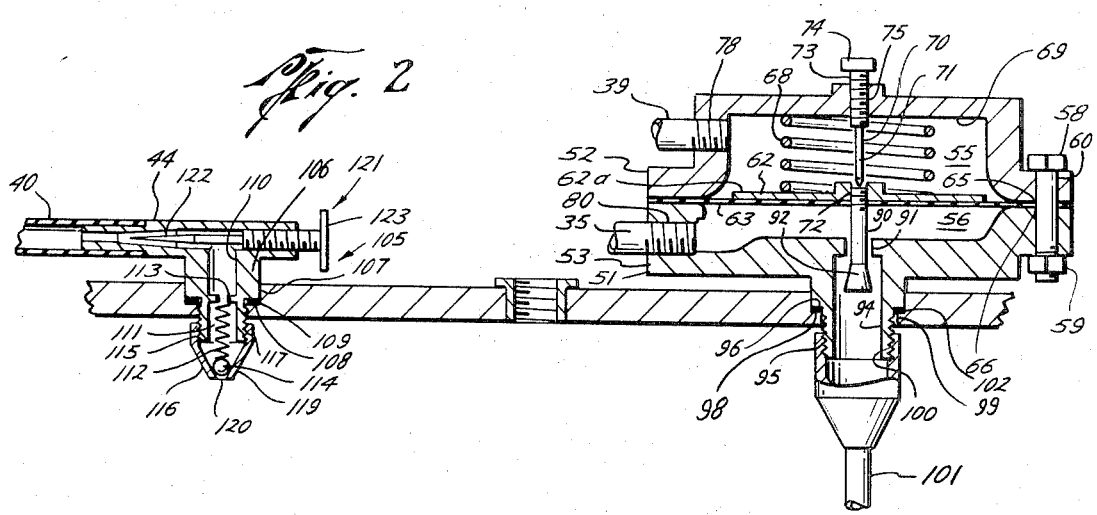
Fig. 2
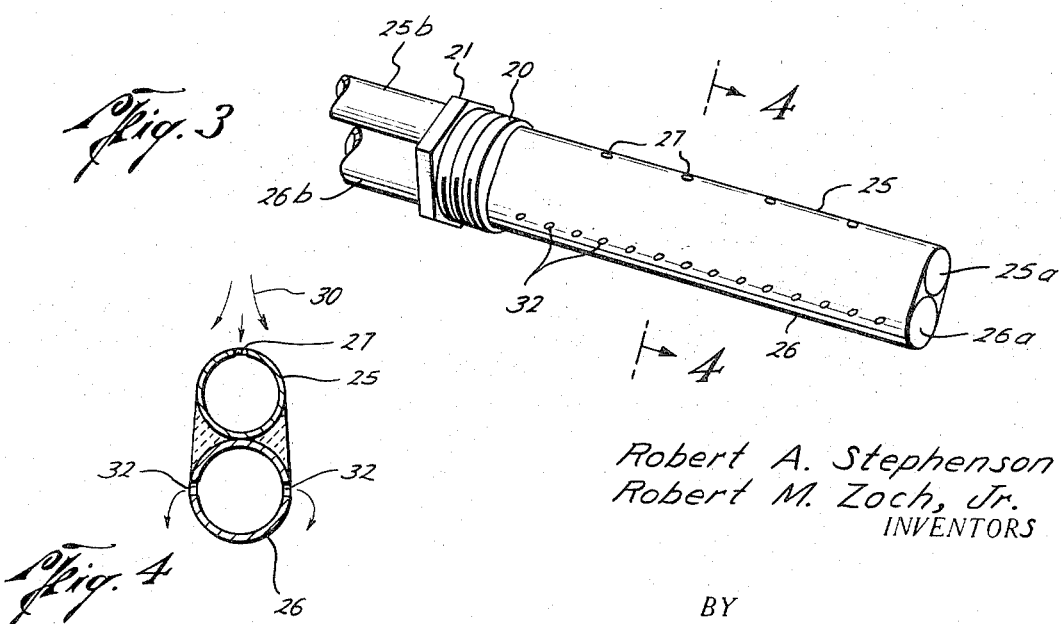
Fig. 3
Fig. 4
Robert A. Stephenson
Robert M. Zoch, Jr.
INVENTORS
BY
Pravel Wilson & Matthews
ATTORNEYS

INJECTOR APPARATUS

BACKGROUND OF THE INVENTION

This invention relates to an injector apparatus for compression engines, more particularly to a new and improved injector apparatus for compression engines.

DESCRIPTION OF THE PRIOR ART

In the prior art there have been several attempts to provide better efficiency and performance for the running of and fuel consumption of compression engines. For example, some diesel engines for trucks use turbocharged mechanisms positioned adjacent an air manifold system for injecting additional air through the manifold system into the motor block and engine. This additional air and fuel injected into the engine under pressure increases the efficiency of the engine, but provides no means for injecting chemicals or other materials into the engine for the reduction of carbon and/or gases from the exhaust system of the engine.

SUMMARY OF THE INVENTION

Briefly, the present invention relates to a new and improved injector apparatus for compression engines including a container filled with suitable fluids for reduction of carbon deposits, gases or smoke from the exhaust system of the engine, tube means positioned in the air intake manifold system for creating a vacuum on the downstream side of such tube to draw fluids from the fluid container into the air intake system and thus into the engine, an impact tube means, if desired, positioned in front of the tube means for forcing air from the air intake manifold system downwardly into the container to provide air pressure in the container to also enable the fluid to be moved out through the other tube means and a regulator system mounted with the container for regulating the air flow into the container.

It is an object of the present invention to provide a new and improved injector apparatus for compression engines.

It is still another object of the present invention to provide an injector apparatus for compression engines for injecting fluids and chemicals into an air intake manifold system of an engine for injection of the fluids into the engine connected with the air intake manifold.

BRIEF DESCRIPTION OF THE DRAWINGS

FIG. 1 is a view, partly in section, illustrating the injector apparatus of the present invention;

FIG. 2 is a partial cross-sectional view of the fluid container and regulator apparatus of the present invention;

FIG. 3 is an exploded detailed view of an impact tube and ejector or fluid flow tube of the injector apparatus of the present invention; and FIG. 4 is a view taken along line 4—4 of FIG. 3, illustrating in cross-section the relationship of the impact tube and the fuel flow tube.

DESCRIPTION OF THE PREFERRED EMBODIMENTS

As illustrated in FIG. 1, the injector apparatus of the present invention is generally designated by the numeral 10, and includes a fluid container generally designated at 11, a regulator apparatus generally designated at 12, a plurality of tubes generally designated at 13, and a fluid flow and impact tube means generally designated at 14. An air intake manifold system generally designated at 15 includes a mouth or entrance way 16, mounted with a suitable support means 17. A passageway 18 extends from the mouth or passageway 16 and through the support means 17 into an engine block E, only a portion of which is shown but which is well-known in the art.

As illustrated in FIGS. 1 and 3, the impact tube and fluid flow tube, generally designated at 14, is positioned in the passageway 18 by threaded engagement of external threads 20 mounted with a suitable thread carrier block 21 being engaged with threads (not shown) in an air manifold intake member 22 which contains the passageway 18.

As illustrated in FIGS. 3 and 4, the impact tube and fluid flow tube, generally designated at 14, includes an impact tube 25 and a fluid flow tube 26. The impact tube 25 is plugged at one end 25a thereof, and extends longitudinally through the block member 21 and outwardly therethrough to an end 25b. The impact tube 25 includes a plurality of spaced holes 27 therein, and is positioned in the air passageway 18 such that air entering in the direction of the arrow 30 enters into holes 27 and out through the end 25b of such tube 25.

The fluid flow tube 26 is positioned immediately adjacent the impact tube 25 and as illustrated in FIG. 3 is plugged at an end 26a which is positioned in the passageway 18 and extends through the member 21 and outwardly therefrom such that the other end 26b of the tube 26, along with the end 25b of the impact tube 25, extends outwardly from the air intake manifold tube 22. A plurality of holes or openings 32 are positioned and drilled in the fluid flow tube 26 such that the holes are positioned substantially transverse, in the disclosed embodiment, from the position of the holes 27 in the impact tube 25 and at an obtuse angle relative to the flow of air in the manifold tube 22. As illustrated in FIG. 4, with air flowing in the direction of the arrows 30, the high pressure side of the tubes generally designated at 14 will be on the side of the impact tube 25 and the low air pressure area will be on the side of the fluid flow tube 26, such that the air stream flowing adjacent the holes 32 will create a suction or vacuum in the tube 26. It should also be noted that in one preferred embodiment that the holes 32 far out number the impact holes 27 in the impact tube 25, but such arrangement might vary depending on the air pressure in the passageway 18.

As illustrated in FIG. 1, a flexible tube member 35 is connected and mounted with the end 25b of the intake tube 25 and extends outwardly therefrom for connection with a threaded air intake channel 80 (FIG. 2). A flexible tube 38 is also mounted at one end with the end 26b of the flow tube 26, and extends outwardly therefrom as illustrated in FIG. 1, and is divided into a Y or branch arms 39 and 40 at the intersection 41 for connection with the threaded vacuum channel 78 and the tube insert member 44 (FIG. 2), respectively, for a purpose to be set forth hereinafter.

As illustrated in FIG. 1, the container for the fluid or chemical F is generally designated at 11, and the regulator is generally designated at 12. The container 11 includes wall members 45 and a floor member 46 for housing such fluid F, and a plurality of external threads 45a at the upper end of the wall members 45 for threaded engagement with the internal threads 47 of the upper closure or cap member 50.

The regulator generally designated at 12 includes a body or housing 51 having an upper portion 52 and a lower portion 53. A chamber in the housing 51 is divided into an upper section 55 and a lower section 56. The upper and lower sections of the housing 52 and 53, are positioned together by a suitable nut and bolt means 58 and 59, respectively, which extend through outwardly extending bolt receiving means 60 of each of the sections 52 and 53, respectively. The upper and lower chambers 55 and 56 are divided by a horizontally positioned plate member 62 and a diaphragm or membrane element 63 which extends outwardly therefrom for positioning between the lower and upper edges 65 and 66 of the upper and lowrr housing sections 52 and 53, respectively.

A spring means 68 is positioned in the upper chamber 55 and engages the upper inner surface 69 of the upper housing 52 and the upper surface 62a of the plate member 62 for continually urging the plate 62 and diaphragm member 63 in a downward direction.

A regulator pin 70 extends downwardly through the upper chamber 55 such that the pin arm 71 extends downwardly into the threaded opening 72 in the plate 62. The pin 70 includes external threads 73 positioned for threaded engagement with the internal threads (not numbered) in the opening 75 in the upper portion of the housing body 52 and a head 74 for rotation of the pin 70 relative to the opening 72 in the plate 62 as desired, and as will be set forth hereinafter.

As illustrated in FIG. 2, the threaded channel 78 provides communication of the upper chamber 55 with the tube 39 and the flexible tube member 38 mounted with the fluid flow tube 26.

As illustrated in FIG. 2, a depending flow arm 90 is threadedly engaged in the threaded opening 72 of plate 62 and extends downwardly therefrom through an opening 91 in lower chamber 56. The arm 90 is shaped such that the depending end 92 is larger in diameter than the remainder of the arm 90, and larger in diameter than the opening 91, such that movement of the arm 90 relative to the opening 91 regulates the amount of air flow through the opening.

The end 92 of arm 90 is positioned in a third air chamber 94 in the lower valve section 53 and is defined by the cylindrical threaded wall 95 and a cylindrical outstanding tab member 96. Tab member 96 matches a tab member 98 formed in the upper closure member 50 such that the walls 95 extend through an opening 99 in such upper closure member 50 for threaded engagement with internal threads 100 of a depending hollow tube 101. A suitable O-ring seal 102 prevents leakage of the vacuum between the tab members 96 and 98.

The tube 101 extends downwardly into the fluid F and terminates in a hollow nozzle member 103 which emits air flowing through the tube 101 as will be set forth hereinafter.

The member 44 which accepts the end of the tube 40 is a nozzle member of a needle valve generally designated at 105 and includes a valve body 106 which is positioned in a seat 107 and rests on the tab member 108. A suitable O-ring seal 109 prevents leakage between the valve body 106 and the tab member 108 and seat 107. The valve body 106 includes a fluid flow chamber 110 which extends from the nozzle member 44 and valve body 106 into a spring chamber 111 housing a spring means 112 retained in such chamber 111 by a tab 113 at one end and a ball member 114 at the other end of such spring 112.

The chamber 111 is defined by external threaded walls 115 of the valve body for receiving a ball retaining member 116 having internal threads 117 for threaded engagement with the external threads of the walls 115 and a conically shaped section 119 having an opening 120 smaller in diameter than the ball 114 such that the spring and ball are positioned between the tab 113 and the opening 120. In this manner, the opening 120 is normally closed unless the vacuum from tube 40 or pressure from inside the container 11 is sufficient to enable the ball 114 to move upwardly by overcoming the force of the spring means 112.

A regulator needle 121 includes a pin 122 which extends into the chamber 110 and is threadably adjustable by rotation of the head member 123 to regulate the flow of fluid from the chamber 110 by closing or opening of the channel through the nozzle member 44.

The use of the regulator generally designated at 12 and the impact tube 25 depend in large part on the pressure in the air manifold intake tube 22 through the passageway 18. Thus, under some conditions placing of the fluid flow tube 26 in the air passageway 18 with the holes 32 positioned substantially transverse relative to the air flow, may impress a sufficient vacuum inside the tube 26, flexible tubes 38 and 40 to enable a vacuum to be pulled or drawn inside the container generally dsignated at 11, such that the vacuum pull overcomes the spring means 112 when in use, to move the ball 114 upwardly enabling flow through the tubes 40 and 38 into the fluid flow tube 26 and out through the holes 32 such that the fluids and vapors are moved into the engine E.

Also, in some instances the impact tube 25 may need to be used and positioned in the air passageway 18 in front of the fluid flow tube 26 without the use of the regulator generally designated at 12. In this embodiment, the air impact tube 25 is connected to the tube 35 and such tube 35 is connected directly with the tube 101 to enable air to bubble out the nozzle 102 for vaporization of the fluid in the container 11. The vaporized fluid is then removed from the container 11 with a vacuum on the tubes 38 and 40, sufficient to overcome the spring means 112 to enable the ball 114 to move upwardly when such means 112 and ball 114 are in use, such that the opening 120 enables the vaporized fluid to move upwardly through the tubes 40 and 38, and the fluid flow tube 26 into the passageway 18.

If the air pressure in the air passageway 18 is varying greatly, or if it is desired to regulate the vaporized fluid flow through the fluid flow tube 26, then the regulator generally designated at 12 of the present invention is used with the fluid flow tube 26 and air impact tube 25. Air enters through the holes 27 in the impact tube 25 and flows through the flexible tube 35 into the lower chamber 56, through the opening 91, third chamber 94 and through the tube 101 out the nozzle 103 to bubble upwardly through the fluid F for vaporization of fluid F in the container between the fluid level and the upper closure member 50. A minimum air flow rate is fixed by the regulator pin 70 such that rotation of the head 74 in a clockwise direction moves the pin member 71 downwardly to contact the depending arm 90 which moves such arm 90, plate 62 and membrane 63 downwardly. Downward movement enables more air to move through the opening 91 and thus vaporizes more fluid. Of course, rotation of the head 74 in a counter-clockwise direction enables the arm 90 to move upwardly such that the end 92 of the arm 90 restricts air flow through the opening 91. Since the vacuum in the upper chamber 55 affects the force exerted on plate 62 and membrane 63, any change in the vacuum in the upper chamber 55 causes a repositioning of plate 62 and membrane 63 to equilibrate the forces of the vacuum in an upward direction and the spring means 68 in a downward direction. Such repositioning of plate 62 and membrane 63 causes movement of arm 90 to regulate fluid flow from chamber 94 due to the restriction imposed by the end 92 of arm 90 in opening 91.

In some instances it may be desirable to use the regulator generally designated at 12 without the fluid flow tube 26 and impact tube 25. For example only, in automobiles there is a very high pressure differential which thus means that the impact tube 25 and/or fluid flow tube 26 are not needed due to such pressure differential and in such occurrences the container generally designated at 11 is open to atmosphere and the tube 38 is a continuous tube that communicates from the inlet channel 78 into the air passageway 18 of the intake manifold tube 22. The tube 38 is connected at one end with the member 50 of the container 11 and at the other end either separately with the air passageway tube 18 or by connection with such tube 38.

In this embodiment, since the pressure differential in the air passageway 18 is sufficient to provide a suitable vacuum in the chamber 55, such vacuum regulates the ambient air flow through the tube 101 for enabling vapors to be removed from the container through the tube 38 into the air passageway 18 as set forth hereinabove.

While not heretofore set forth, it is to be understood that the needle valve generally designated at 121 is an optional feature and may or may not be used depending on the desired and operating conditions of the engine.

One other means of regulating the fluid flow is for the use of the regulator needle or pin 121 in the ball and seat valve means as set forth hereinabove.

The foregoing disclosure and description of the invention are illustrative and explanatory thereof, and various changes in the size, shape, and materials as well as in the details of the illustrated construction may be made without departing from the spirit of the invention.

We claim:

1. An injector apparatus for use in injecting fluid in an air manifold tube air passageway of an engine comprising:
    a. a fluid flow tube means positioned in the air passageway, said tube means having a plurality of holes therein positioned substantially in transverse relation relative to the flow of air through the air passageway;
    b. said fluid flow tube means being positioned in the air passageway such that a vacuum is created to remove vapor or fluids from said holes in said fluid flow tube means into the air passageway;
    c. container means for housing the fluids;
    d. a first flexible tube means connected at one end with said fluid flow tube means and said container wherein the vacuum removes vapor or fluids from said container through said first flexible tube means and into said fluid flow tube means and out through said holes therein into the air passageway;
    e. air impact tube means positioned in front of said fluid flow tube means, said air impact tube means having holes therein for enabling air to flow into said air impact tube means; and
    f. a second flexible tube means mounted at one end with said air impact tube means and extending downwardly into said container and the fluid therein wherein air moves into said impact tube means and through said second flexible tube means and out through the end of said second flexible tube means to vaporize fluid positioned in said container to increase the pressure in said container for enabling vaporized fluids to be removed therefrom through said first flexible tube means.

2. The structure as set forth in claim 1, including valve means positioned with said first flexible tube and mounted with said container, said valve means including:
    a. a valve body having a hollow chamber, spring means positioned in said chamber, a ball means positioned below said spring means, said ball means being forced downwardly by said spring means to continuously close said valve means wherein the vacuum in said first flexible tube and the pressure in said container is sufficient to overcome said spring means to move said ball upwardly to enable vaporized fluid to pass through said valve means and into said first flexible tube.

3. The structure as set forth in claim 1, including:
    a. an air flow and vacuum regulator means mounted with said container;
    b. said regulator means including:
        1. a valve body having a chamber therein;
        2. a flexible diaphragm member extending across said chamber for dividing said chamber into upper and lower chambers;
        3. means mounted with said upper chamber for adjusting said diaphragm mounted between said chambers;
    c. a third flexible tube connected with said first flexible tube and mounted at the other end with said upper chamber;
    d. said second flexible tube communicating with said lower chamber; and
    e. said regulator valve means also including means positioned in said lower chamber responsive to said means positioned in said upper chamber for regulating flow of air into said container wherein regulation of the flow of air into the said container also varies the position of said diaphragm mounted between said chambers in said regulator valve means to regulate flow of vapor into the air passageway.

4. An injector apparatus for use in injecting fluids in an air manifold tube air passageway of an engine comprising:
    a. a fluid flow tube means positioned in the air passageway, said tube means having a plurality of holes therein positioned substantially in transverse relation relative to the flow of air through the air passageway, said fluid flow tube means being positioned in the air passageway such that a vacuum is created to remove vapor or fluids from said holes in said fluid flow tube means into the air passageway;

b. container means for housing the fluids;
c. a first flexible tube means connected at one end with said fluid flow tube means and connected at the other end thereof with said container, wherein vacuum removes vapor or fluids from said container through said first flexible tube means and into said fluid flow tube means and out through said holes therein into the air passageway;
d. an air flow and vacuum regulator means mounted with said container, said regulator means including;
   1. a valve body having a chamber therein;
   2. a flexible diaphragm member extending across said chamber for dividing said chamber into upper and lower chambers, said lower chamber communicating with ambient atmosphere and also communicating with said container by means of a tube mounted therewith and extending in said container into said fluid;
   3. means mounted with said upper chamber for adjusting said diaphragm mounted between said chambers;
e. a second flexible tube means connected at one end with said first flexible tube means and mounted at the other end in communication with said upper chamber; and
f. said regulator means also including means positioned in said lower chamber responsive to said means positioned in said upper chamber for regulating the flow of air into said container wherein regulation of the flow of air into the said container also varies the position of said diaphragm mounted between said chambers in said regulator means to regulate flow of vapor into the air passageway.

* * * * *